June 6, 1972 R. J. HINKEL 3,667,729
GATE CLOSURE APPARATUS
Filed April 20, 1970

*INVENTOR.*
RAYMOND J. HINKEL

BY *Charles L. Rubow*

AGENT

United States Patent Office 3,667,729
Patented June 6, 1972

3,667,729
GATE CLOSURE APPARATUS
Raymond J. Hinkel, Arena, N. Dak. 58413
Filed Apr. 20, 1970, Ser. No. 30,008
Int. Cl. B66f 3/00
U.S. Cl. 254—77                                   5 Claims

ABSTRACT OF THE DISCLOSURE

Wire gate closure and tensioning apparatus comprising a frame mounted on a stationary fence post and pivotally carrying a take-up mechanism which engages one end of a chain or cable, the other end of which joins with a moveable end of the gate. The take-up mechanism includes a handle on each side of the fence for drawing the moveable end of the gate toward the stationary post. A latch maintains the take-up mechanism in position when the gate is closed.

BACKGROUND OF THE INVENTION

This invention pertains generally to the field of gate fasteners, and more particularly to wire gate closures and tensioning devices.

Included among features which are required or desirable in a wire gate fastener are: That it be conveniently operable from either side of the gate; that it provide sufficient mechanical advantage to adequately tension the gate with application of only moderate force; that it be sufficiently versatile to permit convenient adjustment of gate tension and accommodate various types of gate connecting means; and, that it be designed to prevent livestock from releasing the gate. Means should be provided for locking the fastener if desired to prevent unauthorized operation. When locked, it is desirable that the means for attaching the fastener to the gate post be inaccessible to discourage removal of the fastener. Finally, the fastener should be simple, rugged, and economical to manufacture.

It is a principal object of the present invention to produce an improved gate fastener which provides the previously listed features.

It is a further object to provide a gate fastener embodying a positive latch which domestic animals cannot operate to prevent inadvertent release of the gate.

It is yet another object to provide a versatile gate fastener which may be locked, which will accommodate a variety of gate connecting means, and in which the gate tension is easily adjustable.

These and other objects of the present invention will become apparent upon examination of the following specification, claims and drawings.

SUMMARY OF THE INVENTION

The applicant's invention is a unique wire gate fastener comprising a frame adapted to be mounted on a stationary post and pivotally carrying a take-up mechanism which includes U-shaped handle means rotatable on its central portion about an axis perpendicular to the plane of the closed gate between release and closed positions. The take-up mechanism also includes an elongated member fixed at one end to the central portion of the handle means and extending generally perpendicular to the plane thereof. The other end of the elongated member is provided with specially configured attachment means for adjustably accommodating a chain or cable joined with the gate.

A latch is provided for positively maintaining the take-up mechanism in the closed position in which a portion of the mechanism covers at least one mounting hole in the frame to prevent its removal from the post. Hasp means is also provided for locking the take-up mechanism in the closed position.

DESCRIPTION OF THE PREFERRED EMBODIMENT

Figure 1:
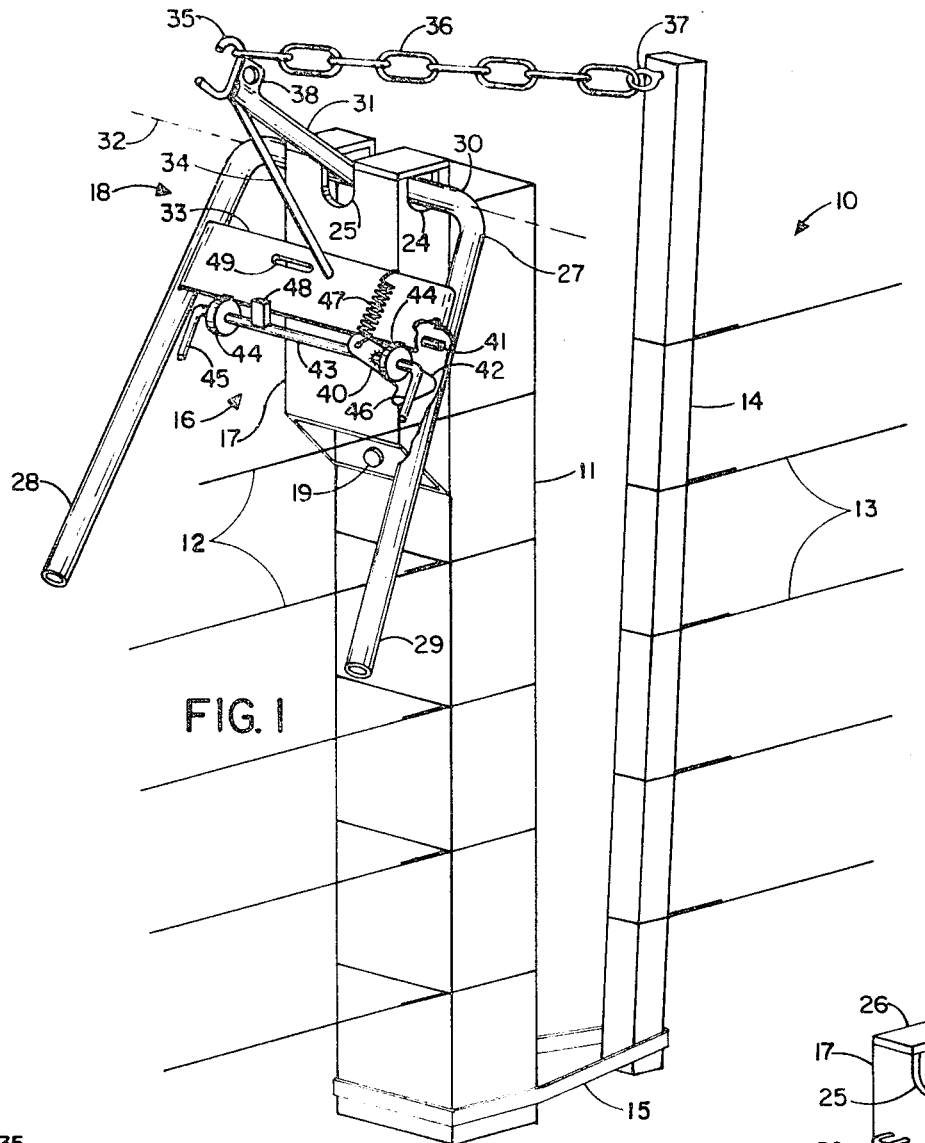
FIG. 1 is a perspective view (partially broken away) of closure apparatus in accordance with the applicant's invention wherein a chain is used as the gate connecting means and wherein the take-up mechanism is shown partially released.

In FIG. 1, a wire gate generally identified by reference numeral 10 is shown adjacent to a stationary fence post 11 to which terminal ends of a plurality of spaced wire strands 12 in a fence are connected. Gate 10 comprises a plurality of spaced wire strands 13 having terminal ends attached to a moveable post 14. The lower end of moveable post 14 may be inserted into the loose end of a loop or band 15 which is attached to the lower end of post 11. The upper end of post 14 may be drawn toward post 11 by means of the applicant's closure and tensioning apparatus generally identified by reference numeral 16. To open gate 10, apparatus 16 is released, thus permitting the upper end of post 14 to be detached from the apparatus and the lower end of post 14 to be removed from loop 15.

Figure 3:
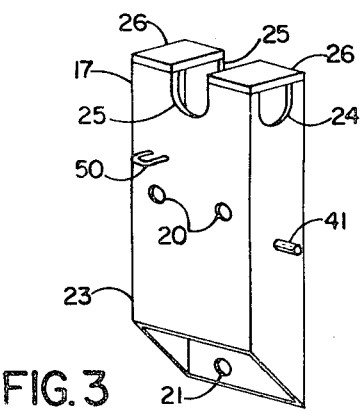
FIG. 3 is a perspective view of the frame used in the present invention.

Closure and tensioning apparatus 16 comprises a frame 17 in which is pivotally mounted a take-up mechanism generally identified by reference numeral 18. Frame 17 is shown having a tubular configuration of rectangular cross section. Frame 17 is mounted on the upper end of post 11 by means of a plurality of bolts, screws, nails or other suitable fasteners 19 extending through holes 20 and 21 shown in FIG. 3. It should be noted that other means of fastening frame 17 to post 11 may also be used, as for example one or more bands extending from frame 17 around post 11. It is pointed out that holes 20 are covered, and hence made inaccessible by a portion of take-up mechanism 18 when the mechanism is in its closed position for purposes which will hereinafter be described.

Frame 17 comprises a tubular body member 23 having a rectangular cross section. The upper ends of opposite walls of body member 23 are provided with notches 24 and 25. Notches 24 and 25 accommodate take-up mechanism 18 which is held in place by means of caps 26. Caps 26 may be welded to body member 23 or held in place by other suitable means after insertion of take-up mechanism 18.

Take-up mechanism 18 comprises an elongated member 27 formed into a U-shaped configuration having first and second handle portions 28 and 29 connected by a central portion 30. The several portions of the U-shaped configuration generally lie in a plane. A second elongated member 31 is fixed at a first end to central portion 30 and extends generally perpendicular to the plane of the U-shaped configuration.

Central portion 30 is pivotally mounted in slots 24 for rotation about an axis 32 which is generally perpendicular to the plane of the closed gate. Slots 25 accommodate elongated member 31 and permit rotation of take-up mechanism 18 from a released position in which member 31 extends toward gate 10 to a closed position in which member 31 extends away from gate 10.

A plate 33 is shown attached between handle portions 28 and 29 of member 27. A brace 34 extends between plate 33 and the outer end of member 31. Plate 33 and brace 34 are preferably welded in place.

The outer end of member 31 is fitted with specially configured attachment means comprising a hook member 35 opening outwardly from member 31. Hook member 35 is further configured and positioned so as to provide an upwardly opening U-shaped portion when take-up mechanism 18 is in its released position. Hook member 35 is configured to engage any desired link of a chain 36, one end of which is shown joined to the upper end of post 14 by means of an eye bolt 37. The U-shaped portion of the hook member 35 facilitates its engagement with chain 36 when take-up mechanism 18 is in its released position.

Figure 2:
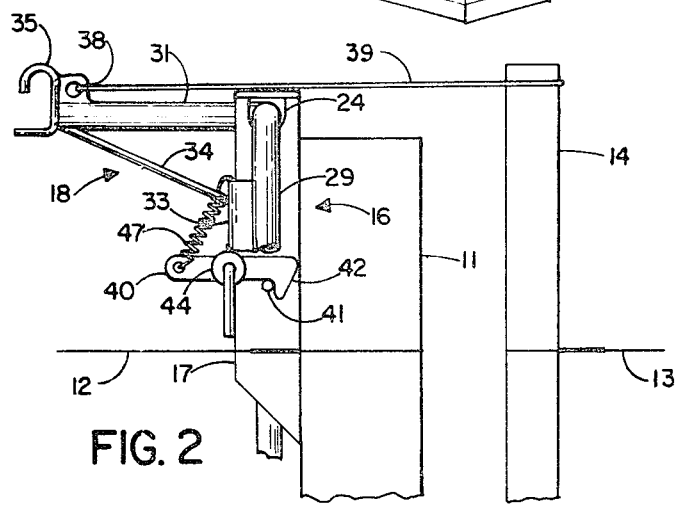
FIG. 2 is a side elevation view (partially broken away) of apparatus in accordance with the applicant's invention wherein a wire loop is used as the gate connecting means and wherein the take-up mechanism is shown closed and latched.

The attachment means on the outer end of member 31 also includes an apertured member 38 for accommodating a wire or cable loop 39 which can be slipped over the upper end of post 14 as shown in FIG. 2.

Apparatus 16 is provided with releasable latching means which comprises hook means 40 pivotally mounted on take-up mechanism 18 and a stationary pin or mating portion 41 fixed to frame 17. Hook means 40 comprises a hook 42 fixed to a rod 43 which extends through a pair of bearing members 44 fixed to plate 33. The ends of rod 43 are formed at right angles to the rod to form first and second levers 45 and 46 adjacent to first and second handle portions 28 and 29 of member 27. Spring bias means 47 is provided to bias hook means 40 toward a position of engagement with mating portion 41. Levers 45 and 46 provide means for pivoting hook means 40 out of engagement with pin 41. A stop 48 is fixed to rod 43 to prevent excessive rotation when hook 40 is not engaged with pin 41.

Plate 33 is provided with an elongated aperture 49 through which the closed end of a U-shaped member 50 (shown in FIG. 3) fixed to frame 17 extends when take-up mechanism 18 is in its closed position. Plate 33, aperture 49 and U-shaped member 50 form a hasp into which a padlock or other locking device can be inserted to lock take-up mechanism 18 in its closed position. With take-up mechanism 18 locked in its closed position, it will be noted that the fasteners extending through holes 20 are not accessible. Hence apparatus 16 cannot be conveniently removed from post 11. Accordingly, maximum protection against undesired opening of gate 10 is provided.

As hereinbefore set forth, the applicant has provided an improved wire gate closure and tensioning apparatus of unique reliability, versatility, simplicity and convenience. Although only a single embodiment is shown and described in detail, it will be apparent to those skilled in the art that various modifications and changes can be made without departing from the applicant's contemplation and teaching. Accordingly, the present invention is not limited to the particular embodiment shown, but only by the terms of the appended claims.

I claim:

1. Apparatus of the class described comprising in combination:
   a frame adapted to be mounted on a stationary post:
   a take-up mechanism pivotally mounted in said frame for rotation about a horizontal axis between first and second positions, said take-up mechanism comprising a first elongated member formed into a planar U-shaped configuration having first and second handle portions connected by a central portion supported in said frame and centered on said horizontal axis, said take-up mechanism further comprising a second elongated member fixed at a first end to the central portion of said first member and extending generally perpendicular to the plane of said U-shaped configuration, a second end of said second member being configured to engage one end of connecting means the other end of which is joined with a movable post, rotation of said take-up mechanism from the first position to the second position drawing said movable post toward said stationary post; and
   releasable latching means comprising a first portion fixed to said frame and a second portion mounted on said take-up mechanism for latching said take-up mechanism in the second position.

2. The apparatus of claim 1 wherein said releasable latching means comprises:
   hook means pivotally mounted on said take-up mechanism;
   a mating portion on said frame positioned to normally engage said hook means when said take-up mechanism is in the second position;
   bias means for biasing said hook means toward a position of engagement with said mating portion; and
   first and second levers located adjacent the first and second handle portions respectively of said first member and connected to said hook means for pivoting said hook means out of engagement with said mating portion.

3. The apparatus of claim 2 further including hasp means adapted for locking said take-up mechanism in the second position, said hasp means comprising an apertured plate fixed to said take-up mechanism, and a U-shaped member fixed to said frame and positioned so that the closed end thereof extends through said apertured plate when said take-up mechanism is in the second position.

4. The apparatus of claim 3 wherein said frame is adapted to be mounted on a post by means of a plurality of holes, at least one of which is covered by said plate when said take-up mechanism is in the second position.

5. The apparatus of claim 4 wherein the second end of said second member is provided with a hook member opening outwardly from said second member, said hook member being further configured and positioned so as to provide an upwardly opening U-shaped portion when said take-up mechanism is in the first position.

References Cited
UNITED STATES PATENTS

| | | | |
|---|---|---|---|
| 1,307,650 | 6/1919 | Wilson | 254—82 |
| 1,456,143 | 5/1923 | Ness | 254—82 |

ANDREW R. JUHASZ, Primary Examiner

D. R. MELTON, Assistant Examiner

U.S. Cl. X.R.

254—83